March 10, 1964    W. E. O'SHEI    3,123,849
WINDSCREEN WIPERS
Filed Feb. 8, 1960    2 Sheets-Sheet 1
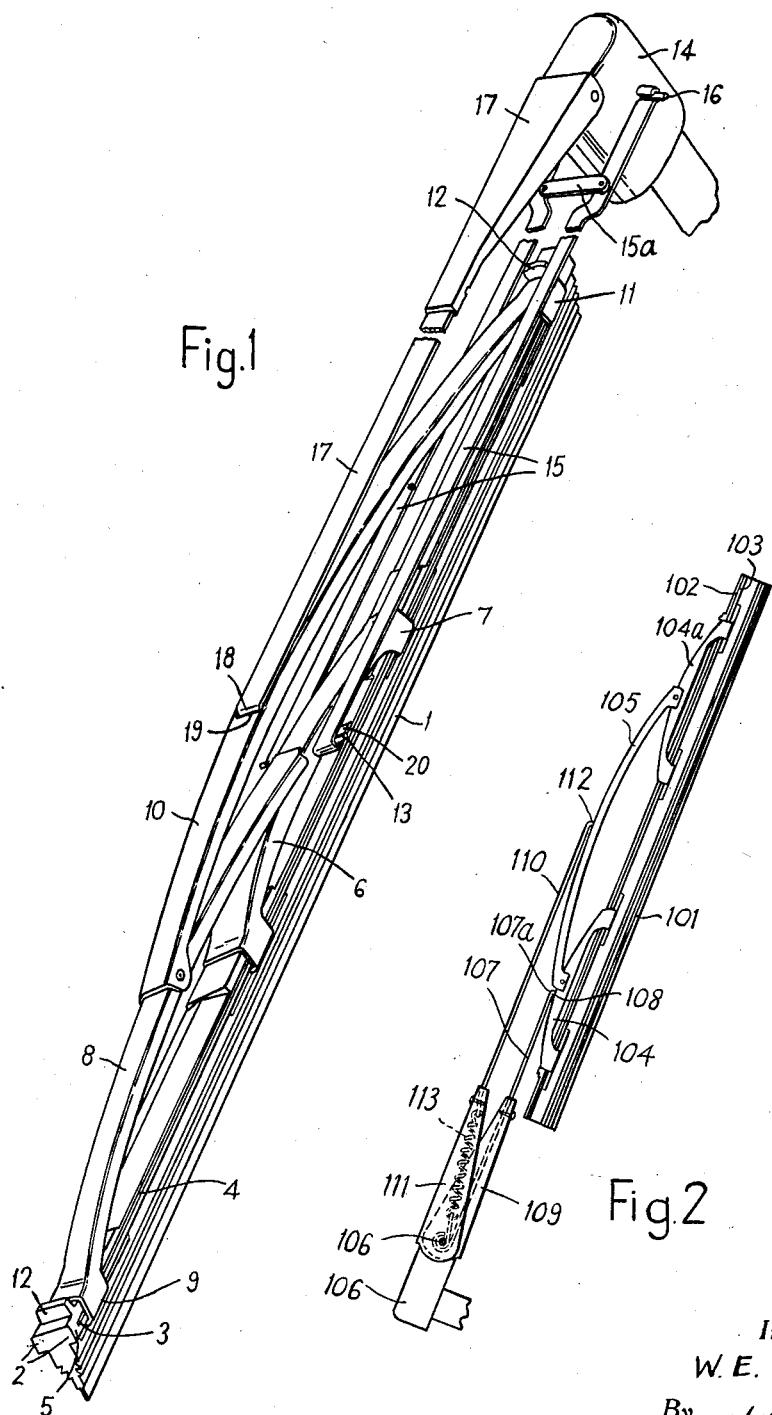
Inventor
W. E. O'Shei
By
Holcombe, Wetherill & Brisebois
Attorneys March 10, 1964  W. E. O'SHEI  3,123,849
WINDSCREEN WIPERS
Filed Feb. 8, 1960  2 Sheets-Sheet 2

Inventor
W. E. O'Shei
By
Attorneys

United States Patent Office 3,123,849
Patented Mar. 10, 1964

3,123,849
WINDSCREEN WIPERS
William Edward O'Shei, 11a Bath Road,
Harlington, England
Filed Feb. 8, 1960, Ser. No. 7,486
Claims priority, application Great Britain Feb. 6, 1959
13 Claims. (Cl. 15—250.35)

The present invention relates to windscreen wipers and more particularly to windscreen wipers which are suitable for wiping curved windscreens.

Windscreen wipers for wiping curved windscreens generally comprise a squeegee element, mounted in a pressure distributing linkage comprising one or more yoke members and/or lever arms which distribute the wiper arm pressure along the length of the wiping edge of the squeegee element.

With known constructions the wiper arm serves the dual purpose of exerting the pressure on to the pressure distributing linkage and also of driving the wiper back and forth across the windscreen, and if the squeegee element engages with the windscreen with greater friction at some points along its length than at others, there is a tendency for the wiper arm, in pulling on the pressure distributing linkage, to pull the squeegee element away from the windscreen at said other points. This problem is particularly severe when wiping highly curved or so-called "wrap-around" windscreens.

According to this invention the means for driving the windscreen wiper across the screen is separated from the arm which serves for applying pressure to the pressure distributing linkage to press the wiping edge of the squeegee element against the windscreen.

From another aspect the invention consists in a windscreen wiper which is driven from the wiper driving spindle by a driving arm or equivalent member which is so constructed that while it effects the driving movement of the wiper it exerts substantially no pressure in the direction to urge the squeegee element against the windscreen (or only a pressure for applying a part of the length of the squeegee element against the windscreen), and the pressure acting on the pressure distributing linkage is applied by a separate spring-pressed arm which reciprocates with the wiper.

The driving arm or member is preferably connected to the windscreen wiper close to the back of the squeegee element. It may be connected either directly to the squeegee element or the flexible strip or strips extending therealong, or to a member of the pressure distributing linkage which is directly connected to the squeegee element or the flexible strip or strips. The pressure arm can simply press against the back of the pressure distributing linkage without connection thereto so that it produces no driving action at all on the wiper, although preferably the end of the pressure arm fits into or embraces the back member of the pressure distributing linkage so as to prevent the arm from slipping off the back of the linkage, in which case the pressure arm may also effect some driving action of the wiper.

A feature of the invention consists in a windscreen wiper for curved windscreens, comprising a squeegee element mounted in a pressure distributing linkage for flexing in the direction normal to the surface of the windscreen, and means for connecting a driving arm to the back of the squeegee element or to a point on the pressure distributing linkage close to the back of the squeegee element and forwardly of the rear of the pressure distributing linkage, the rear of the pressure distributing linkage being adapted to be engaged by a pressure applying arm.

The invention also consists in a novel wiper arm comprising an arm head having a pressure applying arm pivotally connected thereto and urged by a spring in a direction towards the windscreen, and a second driving arm extending below the pressure arm and pivotally connected to the arm head or the pressure arm for swinging movement in the direction normal to the windscreen, the outer end of the driving arm being provided with means for connecting it to a windscreen wiper. The pressure arm may also be provided at its free end with means for locating it with respect to the pressure distributing linkage of the wiper, and a further feature of the invention consists in providing a connection between the pressure arm and the pressure distributing linkage which, when engaged, prevents disengagement of the connection between the driving arm and the wiper.

In order that the invention may be more clearly understood, reference will now be made to the accompanying drawing, in which:

FIG. 1 is a perspective view of one embodiment of the invention.

FIG. 2 is a side view of a second embodiment.

Figure 3:
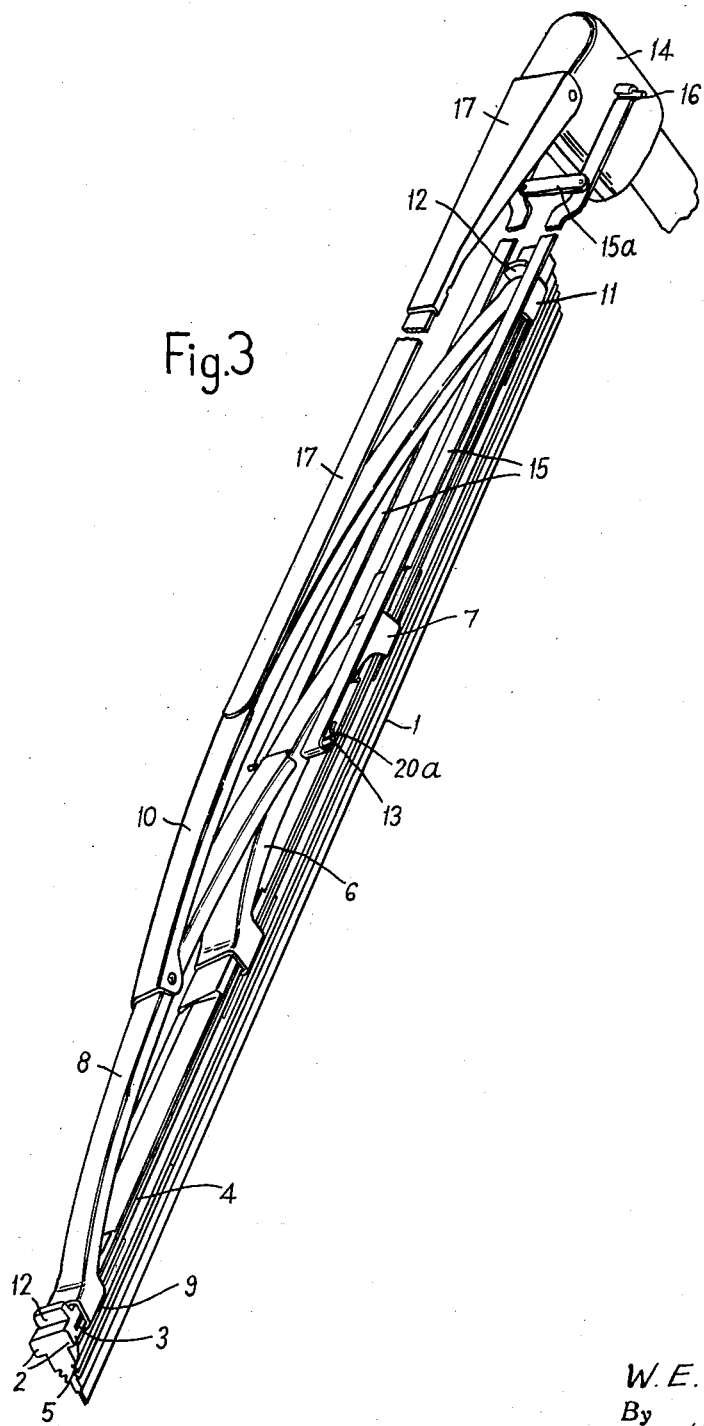
FIG. 3 is a perspective view of a third embodiment.

Referring to FIGURE 1, the wiper comprises a blade assembly comprising a squeegee element 1 moulded of natural or synthetic rubber with a thin wiping edge portion, the cross-section increasing towards the rear of the squeegee element to provide backing-up support for the wiping edge. The rear of the squeegee element is formed with side flanges 2 respectively extending outwardly along opposite sides of the squeegee element. In and along each flange is formed a groove 3. Each groove 3 is closed by an end wall portion 5 at each end thereof. Within each groove 3 is fitted a plain metal strip 4 of which the width corresponds approximately to the depth of a groove 3 so that the outer edge of the strip does not project at all or substantially at all from its associated groove.

6 is a primary yoke member of channel-shape cross-section and is conveniently made of metal. It preferably has a length corresponding to about one-third of the length of the squeegee element and the yoke 6 is attached to the squeegee element by the fingers 7 at opposite ends of the yoke being folded around the undersides or the front faces of the side flanges 2. The primary yoke 6 is preferably disposed approximately centrally of the length of the squeegee element.

8 is a secondary yoke, also preferably of channel-shaped cross-section and made of metal, one end of which is pivotally connected to an intermediate point, for example the centre, of the back of the primary yoke 6 by a pin 13, and the opposite end of which is attached by the fingers 9 towards the outer end of the squeegee element. The second secondary yoke 10, also preferably of channel-shaped cross-section and made of metal, is pivotally connected at one end to an intermediate point on the secondary yoke 8 and is attached at its other end by the fingers 11 to the opposite end of the squeegee element. The pressure distributing linkage is retained against longitudina removal from the back of the squeegee element by the projections 12 moulded on the back of the squeegee element.

14 is the wiper arm head which is adapted to be secured to the wiper driving spindle, and the driving connection between the arm head and the wiper is effected by a driving arm comprising a pair of metal strips 15 which are interconnected by a cross piece 15a and pivotally connected at one end to the arm head at 16 and at its other end to the projecting ends of the hinge pin 13. The driving arm 15 thus holds the wiper substantially upright on the screen and drives the wiper in accordance with the reciprocation of the wiper driving spindle.

Also pivotally connected to the wiper arm head 14 is a pressure arm 17 which is coupled to the arm head by a spring, in known manner, so that the arm 17 will be spring-urged towards the windscreen. The outer end of the pressure arm 17 presses against the back of the rear yoke member 10 of the pressure distributing linkage, thereby pressing the squeegee element, along its whole wiping edge, against the windscreen. The outer end of the pressure arm 17 may simply rest on the back of yoke 10 but preferably has its end bent downwardly, as shown at 18, to extend into an aperture 19 in the back of the yoke 10, thus ensuring that the pressure arm cannot slip off from the back of the yoke.

The inter-engagement of the outer end of the pressure arm 17 with the yoke 10 may also be used for holding the wiper assembled to the driving arm 15. Thus, for example the outer end of the driving arm 15 may be formed with a U-shaped opening 20 into which the ends of the hinge pin 13 can be inserted by longitudinally sliding movement. Upon inserting the end 18 of the pressure arm into the aperture 19, the wiper is interlocked against displacement out of the U-shaped opening 20.

Instead of connecting the driving arm 15 to the pin 13, it can be connected to other positions on the wiper, preferably close to the back of the squeegee element. Thus it may be connected directly to the flexible strips at an appropriate point along their lengths, or to one end or the other of the yoke 6. It may alternatively be connected to the end 11 of the yoke 10, or the driving arm may be constituted by extensions of the flexible strips 3 extending beyond the inner end of the squeegee element.

The pressure distributing linkage may take other forms, as known in the art; for example it may comprise a pair of yokes disposed along the back of the squeegee element and interconnected by a bridge piece against which the pressure arm will act.

FIGURE 2 shows a second embodiment in which the wiper blade and pressure distributing superstructure is constructed substantially as described in the specification of my copending application Serial No. 735,172, filed May 14, 1958, now Patent No. 3,021,549, and comprises a squeegee element 101 having flexible metal strips 102 extending in grooves 103 along the back thereof, of the squeegee element being mounted in the two primary yokes 104, 104a which are interconnected by the bridge piece 105. The wiper arm head 106 has pivoted thereon by the pivot pin 106a the driving arm 107, the free end 107a of which is bent towards the windscreen and locates in an aperture 108 in the back of the yoke member 104 adjacent the point where the bridge piece 105 is connected thereto. The end 107a may be retained in the aperture by a suitable latch. The inner end of the arm 107 fits in an inverted channel-shaped portion 109 which is freely pivoted on the pin 106. The wiper arm head also carries a second arm, the pressure arm 110, which conveniently at its inner end is carried in a channel-shaped portion 111, the side walls of which fit outside the side walls of the channel portion 109 and are pivotally mounted on the pivot pin 106. The free end of the pressure arm 110 is bent towards the windscreen and locates in an aperture 112 in the back of the bridge piece 105 and adjacent the centre thereof. The pressure arm 110 is urged in known manner by a spring, for example as indicated at 113, towards the windscreen.

FIGURE 3 shows a third embodiment of the invention which is generally similar to that shown in FIGURE 1, like reference numerals in the two views indicating like-parts. However, this third embodiment differs from that shown in FIGURE 1 in that the free end of the pressure arm 17 is not connected to the secondary yoke 10 but simply presses on the back thereof, adjacent the centre of the blade assembly, as shown, and the outer end of the driving arm is formed with closed loops 20a which embrace the ends of the hinge pin 13.

Instead of connecting the inner end of the driving arm to the arm head, it may be connected to a point on the pressure arm. Furthermore, the driving arm may be arranged to move over or be controlled by a cam so that it will be lifted away from the windscreen at certain positions in the arc of swing, to facilitate the squeegee element flexing to conform with the curvature of the windscreen. The driving arm may also be spring-pressed towards the windscreen.

By means of the invention, the squeegee element is free to flex under the pressure applied by the pressure arm to conform with the curvature of the screen, this pressure being applied with the desired distribution along the length of the squeegee element and independently of the force exerted by the driving arm in moving the wiper across the screen. Since the members of the pressure distributing linkage do not have to effect driving, they may be made lighter and of smaller section than in existing wipers.

I claim:

1. In a windscreen wiper, a wiper comprising a squeegee element and a pressure distributing superstructure, a driving arm connecting said wiper to a driving spindle so as to effect wiping driving movement of the wiper blade while exerting substantially no pressure thereon in the direction to urge the squeegee element against the windscreen, and a separate spring-pressed arm connected to said driving spindle to swing with said driving arm while maintaining a substantially constant angular position relative thereto, said second arm acting on the pressure distributing superstructure to apply thereon a pressure urging the squeegee element against the windscreen.

2. A windscreen wiper as claimed in claim 1, wherein the pressure arm presses against the back of the pressure distributing superstructure without being connected thereto.

3. A windscreen wiper for curved windscreens, comprising a wiper including a squeegee element mounted in a pressure distributing linkage arranged along the back of said squeegee element for flexing in the direction normal to the surface of the windscreen, a driving arm and means connecting said driving arm to the wiper to drive the squeegee element across the windscreen, and a pressure applying arm acting on the pressure distributing linkage to urge the squeegee element towards the windscreen, said driving arm and pressure applying arm being connected to a common driving spindle to swing as a unit while maintaining a substantially constant angular position relative to each other and said driving arm being connected to the wiper at a point close to the back of the squeegee element.

4. In a windscreen wiper, a wiper comprising a squeegee element and a pressure distributing superstructure arranged along the back of said squeegee element and projecting away therefrom, a driving arm connecting said wiper to an oscillating driving spindle so that oscillation of said spindle effects oscillating, wiping movement of said squeegee element while exerting substantially no pressure thereon in the direction to urge the squeegee element against the windscreen, a second separate arm connected to said driving spindle to swing with said first arm while maintaining a substantially constant angular position relative thereto, said second arm contacting the rear of said pressure distributing superstructure, and spring means urging said second arm against said superstructure to apply thereon a pressure urging the squeegee element against the windscreen, said driving arm being connected to the pressure distributing superstructure at a point close to the back of said squeegee element and forwardly of the rear of said superstructure.

5. A windscreen wiper for curved windscreens comprising a squeegee element, a pressure distributing linkage for flexing in the direction normal to the surface of the windscreen, means mounting the back of said squeegee element in said pressure distributing linkage, a driving arm, means connecting said driving arm to the back of the squeegee element, a pressure applying arm contacting the rear of said pressure distributing linkage, spring means urging said pressure applying arm against said linkage, and means for driving said driving and pressure applying arms as a unit while maintaining them at a substantially constant angular position relative to each other.

6. A windscreen wiper for curved windscreens, comprising a squeegee element, a pressure distributing superstructure arranged along the back of said squeegee element for flexing in the direction normal to the surface of the windscreen, a driving arm driven by a wiper driving spindle, means connecting said driving arm to the pressure distributing superstructure, said means comprising complementary interengaging parts on said driving arm and superstructure releasably engageable by relative movement in the direction of the longitudinal axis of the squeegee element, a separate arm connected to said driving spindle, spring means urging said separate arm against the back of the pressure distributing superstructure, and means connecting said separate arm to the pressure distributing superstructure preventing relative movement of said driving arm and superstructure in the direction of the longitudinal axis of the squeegee element.

7. A windscreen wiper for curved windscreens, comprising a squeegee element, a pressure distributing superstructure consisting of a plurality of pressure distributing yokes interconnected with each other and the back of the squeegee element for flexing said squeegee element in the direction normal to the surface of the windscreen, a driving arm connecting said superstructure to a driving spindle so as to effect driving movement of the squeegee element while exerting substantially no pressure thereon in the direction to urge the squeegee element against the windscreen, said driving arm and superstructure being releasably engageable by relative movement in the direction of the longitudinal axis of the squeegee element, a second arm connected to said driving spindle and urged against the rearmost yoke of the pressure distributing superstructure toward the windscreen by spring means, and means connecting said second arm to said rearmost yoke preventing relative longitudinal movement of said driving arm and superstructure.

8. In windscreen wiper apparatus, the combination comprising a squeegee element, a pressure distributing superstructure, means connecting the back of said squeegee element to said pressure distributing superstructure, a wiper arm head adapted for connection to a wiper driving spindle, a driving arm comprising two spaced parallel members extending along either side of said superstructure and pivoted adjacent one end to said arm head for swinging movement in the direction normal to the windscreen, a pin extending from either side of said superstructure substantially parallel to the axis of pivoting of said driving arm to said arm head, means forming U-shaped openings in the other ends of said members of the driving arm, the arms of the U extending in the direction of the longitudinal axis of said squeegee element for hooking over the ends of said pin extending to either side of said superstructure, a pressure applying arm pivotally connected to the arm head and urged by a spring in the direction towards the windscreen, and means positively connecting said pressure applying arm to said pressure distributing superstructure preventing disengagement of said pin from the U-shaped means of said driving arm.

9. In a windscreen wiper, the combination comprising a squeegee element, a pressure distributing superstructure arranged along the back of said squeegee element and extending rearwardly thereof, a driving arm interconnecting said superstructure and a driving spindle so as to effect wiping driving movement of said squeegee element while exerting substantially no pressure thereon in the direction to urge the squeegee element against the windscreen, a separate arm connected to said driving spindle to swing with said driving arm while maintaining a substantially constant angular position relative thereto, said separate arm contacting the rear of said pressure distributing superstructure, and spring means urging said separate arm against said superstructure to apply thereon a pressure urging the squeegee element against the windscreen, wherein the means connecting said driving arm to said superstructure is located at a point close to the back of the squeegee element forwardly of the rear of said superstructure and closer to said driving spindle than the point at which said separate spring-urged arm is connected to said superstructure.

10. In a windscreen wiper, a wiper comprising a squeegee element having an elongated wiping edge, at least one flexible strip assembled to and extending along the squeegee element adjacent the back thereof which permits the squeegee element to flex in a plane normal to the windscreen while restraining the transverse flexing of the squeegee element, and a pressure distributing superstructure assembled to the back of the squeegee element and comprising at least one primary yoke having its ends connected to the back of the squeegee element and a secondary yoke disposed rearwardly of the primary yoke and arranged to transmit pressure applied to the secondary yoke to space points along the squeegee element at least partly through said primary yoke, a wiper arm head adapted to be secured to a driving spindle, a driving arm pivotably connected at one end to said head for free swinging movement towards and away from the windscreen, means connecting the other end of said driving arm to the primary yoke at a point close to the back of the squeegee element so as to effect driving movement of the wiper across the screen while exerting substantially no pressure thereon in the direction to urge the squeegee element against the windscreen, said connecting means comprising complementary interengaging parts on said driving arm and said primary yoke releasably engageable by relative movement in the direction of the length of the squeegee element, a separate pressure arm pivotably connected at one end to the arm head and urged by spring means towards the windscreen, the free end of said pressure arm bearing against the back of the secondary yoke to apply thereon the spring-produced pressure to urge the squeegee element against the windscreen, and interlock means maintained by said spring pressure and preventing displacement of the pressure arm relative to the secondary yoke in the direction of the length of the squeegee element.

11. In a windscreen wiper, a wiper comprising a squeegee element having an elongated wiping edge, and a pressure distributing superstructure assembled to the back of the squeegee element and comprising at least one primary yoke connected to the squeegee element and a secondary yoke disposed rearwardly of the primary yoke and arranged to transmit pressure applied to the secondary yoke to spaced points along the squeegee element at least partly through said primary yoke, a wiper arm head adapted to be secured to a driving spindle, a driving arm pivotably connected at one end to said head for free swinging movement towards and away from the windscreen, means connecting the other end of said driving arm to the primary yoke so as to effect driving movement of the wiper across the screen while exerting substantially no pressure thereon in the direction to urge the squeegee element against the windscreen, and a separate pressure arm pivotably connected at one end to the arm head to swing with said driving arm while maintaining a substantially constant angular position relative thereto, said separate arm urged by spring means towards the windscreen, the free end of said pressure arm bearing against the back of the secondary yoke to apply thereon the spring-produced pressure to urge the squeegee element against the windscreen.

12. In a windscreen wiper, a wiper comprising a squeegee element having an elongated wiping edge, and a pressure distributing superstructure assembled to the back of the squeege element, a wiper arm head adapted to be secured to a driving spindle, a driving arm pivotably connected at one end to said head for swinging movement towards and away from the windscreen, means connecting the other end of said driving arm to the wiper so as to effect driving movement of the wiper across the screen while exerting substantially no pressure thereon in the direction to urge the squeegee element against the windscreen, said connecting means comprising complementary interengaging parts on said driving arm and said wiper releasably engageable by relative movement in the direction of the length of the squeegee element, a separate pressure arm pivotably connected at one end to the arm head and urged by spring means towards the windscreen, the free end of said pressure arm bearing against the superstructure to apply thereon the spring-produced pressure to urge the squeegee element against the windsceen, and interlock means preventing displacement of the pressure arm relative to the superstructure in the direction of the length of the squeegee element.

13. In a windscreen wiper, a wiper comprising a squeegee element having an elongated wiping edge, and a pressure distributing superstructure assembled to the back of the squeegee element, a wiper arm head adapted to be secured to a driving spindle, a driving arm pivotably connected at one end to said head for free swinging movement towards and away from the swindscreen, means connecting the other end of said driving arm to the superstructure at a point close to the back of the squeegee element so as to effect driving movement of the wiper across the screen while exerting substantially no pressure thereon in the direction to urge the squeegee element against the windscreen, and a separate pressure arm pivotably connected at one end to the arm head to swing with said driving arm while maintaining a substantially constant angular position relative thereto, said separate arm urged by spring means towards the windscreen, the free end of said pressure arm bearing against the back of the superstructure to apply thereon the spring-produced pressure to urge the squeegee element against the windscreen.

References Cited in the file of this patent
UNITED STATES PATENTS

| | | |
|---|---|---|
| 2,356,424 | Paton | Aug. 22, 1944 |
| 2,809,388 | Wise | Oct. 15, 1957 |
| 2,834,038 | Kramer | May 13, 1958 |

FOREIGN PATENTS

| | | |
|---|---|---|
| 1,032,359 | France | Mar. 25, 1953 |